United States Patent
Jalali et al.

(10) Patent No.: US 11,400,934 B2
(45) Date of Patent: *Aug. 2, 2022

(54) SYSTEMS AND METHODS FOR COOPERATIVE RAMP MERGE

(71) Applicant: Honda Motor Co., Ltd., Tokyo (JP)

(72) Inventors: Soroush Jalali, Ann Arbor, MI (US); Hossein Nourkhiz Mahjoub, Ann Arbor, MI (US); Yasir Khudhair Al-Nadawi, Ann Arbor, MI (US)

(73) Assignee: Honda Motor Co., Ltd., Tokyo (JP)

( * ) Notice: Subject to any disclaimer, the term of this patent is extended or adjusted under 35 U.S.C. 154(b) by 181 days.

This patent is subject to a terminal disclaimer.

(21) Appl. No.: 16/821,219

(22) Filed: Mar. 17, 2020

(65) Prior Publication Data

US 2021/0291835 A1 Sep. 23, 2021

(51) Int. Cl.
*B60W 30/18* (2012.01)
*G08G 1/16* (2006.01)
(Continued)

(52) U.S. Cl.
CPC ...... *B60W 30/18163* (2013.01); *B60W 40/04* (2013.01); *G05D 1/0289* (2013.01);
(Continued)

(58) Field of Classification Search
CPC ... B60W 30/18163; B60W 2554/4041; B60W 2554/4042; B60W 2554/408; B60W 40/04; G08G 1/167; G05D 1/0289
(Continued)

(56) References Cited

U.S. PATENT DOCUMENTS

| | | |
|---|---|---|
| 6,204,778 B1 | 3/2001 | Bergan et al. |
| 2013/0099911 A1 | 4/2013 | Mudalige et al. |

(Continued)

FOREIGN PATENT DOCUMENTS

| | | |
|---|---|---|
| CN | 109559532 | 4/2019 |
| CN | 111768642 | 10/2020 |

(Continued)

OTHER PUBLICATIONS

A. E. Bryson, Applied optimal control: optimization, estimation and control. Routledge, 2018.
(Continued)

*Primary Examiner* — Atul Trivedi
(74) *Attorney, Agent, or Firm* — Rankin, Hill & Clark LLP

(57) ABSTRACT

Systems and methods for cooperative ramp merger are described herein. In one embodiment, a system for assisting with a merge based on a ramp location of a ramp is provided. A swarm module causes a host vehicle to join a swarm created to assist the merging vehicle in the merge maneuver. A position module identifies relative positions of the host vehicle and other members of the swarm. An identification module selects a role for the host vehicle based on the relative positions of the host vehicle and the other members of the plurality of members. A constraint module calculates a merge location area based on the relative positions of the host vehicle and the other members of the plurality of members and the ramp location. A cooperative module determines a cooperative action for the host vehicle based on the role of the host vehicle and the merge location area.

20 Claims, 5 Drawing Sheets

(51) Int. Cl.
  *B60W 40/04* (2006.01)
  *G05D 1/02* (2020.01)
(52) U.S. Cl.
  CPC ....... *G08G 1/167* (2013.01); *B60W 2554/408* (2020.02); *B60W 2554/4041* (2020.02); *B60W 2554/4042* (2020.02)
(58) Field of Classification Search
  USPC .......................................................... 701/36
  See application file for complete search history.

(56) References Cited

U.S. PATENT DOCUMENTS

| | | | |
|---|---|---|---|
| 2015/0153735 A1 | 6/2015 | Clarke et al. | |
| 2015/0210312 A1* | 7/2015 | Stein ................. | H04N 7/183 701/41 |
| 2016/0086285 A1 | 3/2016 | Jordan Peters et al. | |
| 2017/0158199 A1* | 6/2017 | Pallett ................. | B60W 40/107 |
| 2017/0160745 A1* | 6/2017 | Lauffer ............... | G05D 1/0274 |
| 2018/0024562 A1* | 1/2018 | Bellaiche ............ | G06V 20/588 701/26 |
| 2018/0120859 A1* | 5/2018 | Eagelberg ........... | G05D 1/0088 |
| 2018/0284266 A1* | 10/2018 | Talamonti ........... | G05D 1/0214 |
| 2018/0319402 A1* | 11/2018 | Mills .................. | B60W 50/14 |
| 2018/0319403 A1* | 11/2018 | Buburuzan ......... | B62D 15/0255 |
| 2018/0350239 A1 | 12/2018 | Hourdos et al. | |
| 2019/0266489 A1* | 8/2019 | Hu ...................... | G06N 3/08 |
| 2019/0279502 A1* | 9/2019 | Fowe .................. | G08G 1/096716 |
| 2019/0310648 A1 | 10/2019 | Yang et al. | |
| 2019/0329777 A1* | 10/2019 | Rajab ................. | G08G 1/167 |
| 2019/0329778 A1* | 10/2019 | D'sa ................... | B62D 15/025 |
| 2019/0329779 A1* | 10/2019 | D'sa ................... | G06N 20/20 |
| 2020/0035092 A1* | 1/2020 | Rajab ................. | B60W 30/12 |
| 2020/0232806 A1* | 7/2020 | Goldman ............ | G08G 1/167 |
| 2020/0353863 A1* | 11/2020 | Weksler .............. | B60W 50/14 |
| 2020/0406969 A1* | 12/2020 | Ersal .................. | B60W 10/184 |
| 2021/0070320 A1* | 3/2021 | Nagaraja ............ | G06N 3/0454 |
| 2021/0110484 A1* | 4/2021 | Shalev-Shwartz .. | G01C 21/3407 |
| 2021/0241623 A1* | 8/2021 | Wang ................. | G08G 1/052 |
| 2021/0291835 A1* | 9/2021 | Jalali ................. | G08G 1/075 |
| 2021/0295703 A1* | 9/2021 | Jalali ................. | G08G 1/164 |
| 2021/0347372 A1* | 11/2021 | Bagschik ............ | G06F 17/18 |
| 2021/0350150 A1* | 11/2021 | An ..................... | G06N 3/04 |

FOREIGN PATENT DOCUMENTS

| | | | | |
|---|---|---|---|---|
| CN | 112758092 | | 5/2021 | |
| EP | 3650297 A1 | * | 5/2020 | ....... B60W 30/0956 |
| GB | 2578916 A | * | 6/2020 | ........... B60W 30/08 |
| GB | 2578917 A | * | 6/2020 | ........... B60W 10/20 |
| GB | 2579021 A | * | 6/2020 | ....... B60W 30/0956 |
| JP | 2017001665 A | * | 1/2017 | ........... B60W 30/16 |
| WO | WO-2021053390 A1 | * | 3/2021 | |
| WO | WO-2021076705 A2 | * | 4/2021 | |

OTHER PUBLICATIONS

A. Katriniok, J. P. Maschuw, F. Christen, L. Eckstein, and D. Abel, "Optimal vehicle dynamics control for combined longitudinal and lateral autonomous vehicle guidance," in Control Conference (ECC), 2013 European. IEEE, 2013, pp. 974-979.
S. Lam and J. Katupitiya, "Cooperative autonomous platoon maneuvers on highways," in Advanced Intelligent Mechatronics (AIM), 2013 IEEE/ASME International Conference on. IEEE, 2013, pp. 1152-1157.
X. Meng and C. G. Cassandras, "Optimal control of autonomous vehicles for non-stop signalized intersection crossing," in 2018 IEEE Conference on Decision and Control (CDC). IEEE, 2018, pp. 6988-6993.
P. Varaiya, "Smart cars on smart roads: problems of control," IEEE Transactions on automatic control, vol. 38, No. 2, pp. 195-207, 1993.
M. Wang, W. Daamen, S. P. Hoogendoorn, and B. van Arem, "Cooperative car-following control: Distributed algorithm and impact on moving jam features," IEEE Transactions on Intelligent Transportation Systems, vol. 17, No. 5, pp. 1459-1471, 2016.
M. Werling, J. Ziegler, S. Kammel, and S. Thrun, "Optimal trajectory generation for dynamic street scenarios in a frenet frame," in Robotics and Automation (ICRA), 2010 IEEE International Conference on. IEEE, 2010, pp. 987-993.
D. Zhao, X. Huang, H. Peng, H. Lam, and D. J. LeBlanc, "Accelerated evaluation of automated vehicles in car-following maneuvers," IEEE Transactions on Intelligent Transportation Systems, vol. 19, No. 3, pp. 733-744, 2018.
C. Bax, P. Leroy, and M. P. Hagenzieker, "Road safety knowledge and policy: A historical institutional analysis of the netherlands," Transportation research part F: traffic psychology and behaviour, vol. 25, pp. 127-136, 2014.
D. Bevly, X. Cao, M. Gordon, G. Ozbilgin, D. Kari, B. Nelson, J. Woodruff, M. Barth, C. Murray, A. Kurt et al., "Lane change and merge maneuvers for connected and automated vehicles: A survey," IEEE Transactions on Intelligent Vehicles, vol. 1, No. 1, pp. 105-120, 2016.
M. A. S. Kamal, M. Mukai, J. Murata, and T. Kawabe, "Model predictive control of vehicles on urban roads for improved fuel economy," IEEE Transactions on control systems technology, vol. 21, No. 3, pp. 831-841, 2013.
B. Li, Y. Zhang, Y. Ge, Z. Shao, and P. Li, "Optimal control-based online motion planning for cooperative lane changes of connected and automated vehicles," in Intelligent Robots and Systems (IROS), 2017 IEEE/RSJ International Conference on. IEEE, 2017, pp. 3689-3694.
Y. Luo, Y. Xiang, K. Cao, and K. Li, "A dynamic automated lane change maneuver based on vehicle-to-vehicle communication," Transportation Research Part C: Emerging Technologies, vol. 62, pp. 87-102, 2016.
J. Nilsson, M. Brännström, E. Coelingh, and J. Fredriksson, "Lane change maneuvers for automated vehicles," IEEE Transactions on Intelligent Transportation Systems, vol. 18, No. 5, pp. 1087-1096, 2017.
J. Nilsson, M. Brännström, E. Coelingh, and J. Fredriksson, "Longitudinal and lateral control for automated lane change maneuvers," in American Control Conference (ACC), 2015. IEEE, 2015, pp. 1399-1404.
K. Vogel, "A comparison of headway and time to collision as safety indicators," Accident analysis & prevention, vol. 35, No. 3, pp. 427-433, 2003.
M. Wang, S. P. Hoogendoorn, W. Daamen, B. van Arem, and R. Happee, "Game theoretic approach for predictive lane-changing and car-following control," Transportation Research Part C: Emerging Technologies, vol. 58, pp. 73-92, 2015.
F. You, R. Zhang, G. Lie, H. Wang, H. Wen, and J. Xu, "Trajectory planning and tracking control for autonomous lane change maneuver based on the cooperative vehicle infrastructure system," Expert Systems with Applications, vol. 42, No. 14, pp. 5932-5946, 2015.
Office Action of U.S. Appl. No. 16/987,299 dated Jan. 21, 2022, 29 pages.
Notice of Allowance of U.S. Appl. No. 16/987,299 dated Jun. 6, 2022, 10 pages.

* cited by examiner

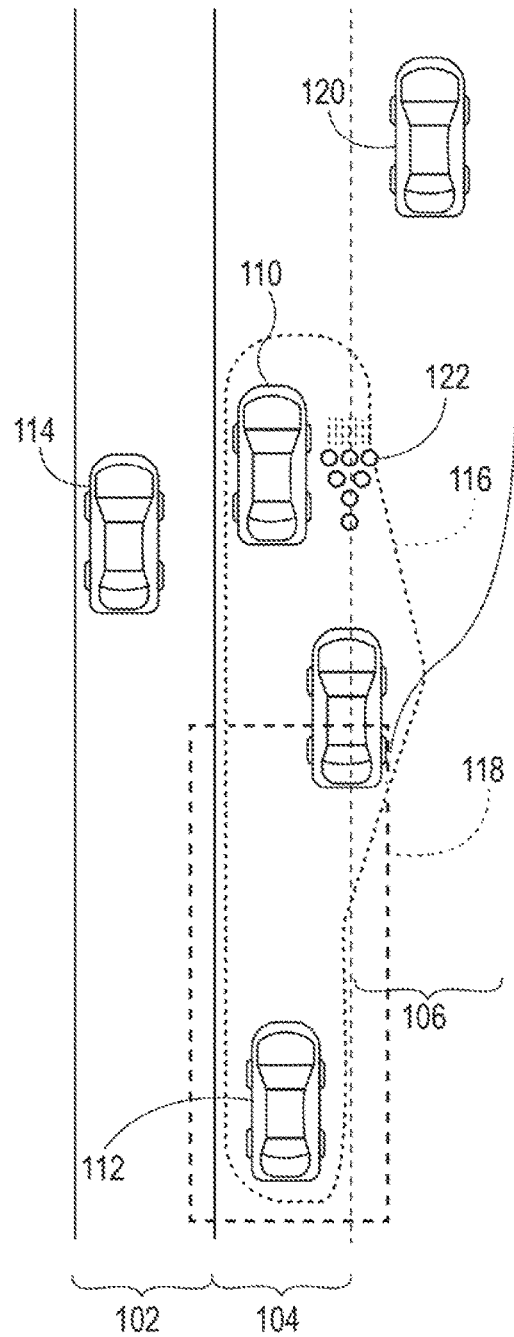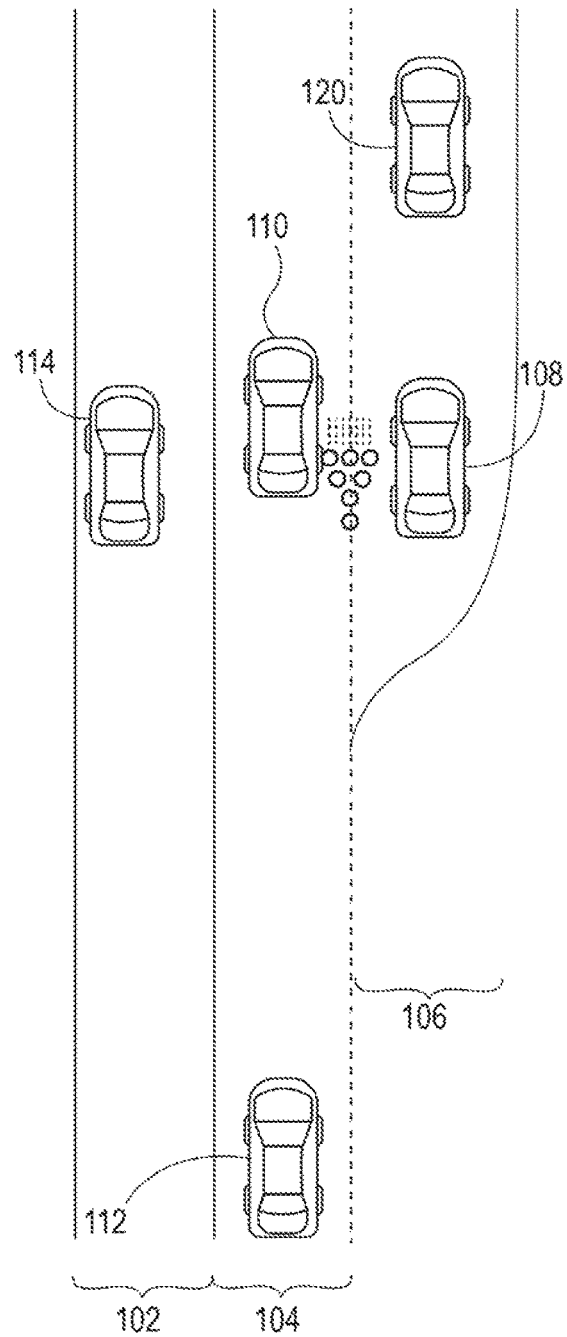
FIG. 1C
FIG. 1D

SYSTEMS AND METHODS FOR COOPERATIVE RAMP MERGE

BACKGROUND

Changing lanes is a stressful driving scenario and can cause traffic congestion and collisions. Lane changing occurs when a vehicle in one lane moves laterally into an adjacent lane of traffic. The driver of the lane changing vehicle must decide whether the lane change is possible based on the relative location and speed of the vehicles already in the adjacent lane. For example, a driver has to determine whether a gap in the traffic of the adjacent lane will be available by the time the vehicle moves to the adjacent lane. This is further complicated in scenarios in which traffic is entering or exiting a roadway. For example, suppose that a vehicle is intended to use an exit ramp but the vehicle is unable to access the exit ramp in the vehicle's currently lane. The vehicle may need to perform a merge maneuver with downstream vehicles to move to a lane with access to the exit ramp. Moreover, timing is a factor as the merge maneuver should be conducted before the vehicle passes the exit ramp and access to the exit ramp closes.

BRIEF DESCRIPTION

According to one aspect, a cooperative ramp merge system for assisting a merging vehicle with a merge maneuver between a preceding vehicle and a following vehicle based on a ramp location of a ramp is provided. The cooperative ramp merge system includes a swarm module, a position module, an identification module, a constraint module, and a cooperative module. The swarm module causes a host vehicle to join a swarm created to assist the merging vehicle in the merge maneuver. The swarm includes a plurality of members, and the host vehicle becomes a member of the plurality of members. The position module identifies relative positions of the host vehicle and other members of the plurality of members. The identification module selects a role for the host vehicle as the merging vehicle, the preceding vehicle, or the following vehicle based on the relative positions of the host vehicle and the other members of the plurality of members. The constraint module calculates a merge location area based on the relative positions of the host vehicle and the other members of the plurality of members and the ramp location. The cooperative module determines a cooperative action for the host vehicle based on the role of the host vehicle and the merge location area.

According to another aspect, a cooperative ramp merge method for assisting a merging vehicle with a merge maneuver between a preceding vehicle and a following vehicle based on a ramp location of a ramp is provided. The cooperative ramp merge method includes the host vehicle joining a swarm created to assist the merging vehicle in the merge maneuver. The swarm includes a plurality of members, and the host vehicle becomes a member of the plurality of members. The cooperative ramp merge method also includes identifying relative positions of the host vehicle and other members of the plurality of members. The cooperative ramp merge method further includes selecting a role for the host vehicle as the merging vehicle, the preceding vehicle, or the following vehicle based on the relative positions of the host vehicle and the other members of the plurality of members. The cooperative ramp merge method yet further includes calculating a merge location area based on the relative positions of the host vehicle and the other members of the plurality of members and the ramp location. The cooperative ramp merge method still further includes determining a cooperative action for the host vehicle based on the role of the host vehicle and the merge location area.

According to a further aspect, a non-transitory computer-readable storage medium including instructions that when executed by a processor, cause the processor to perform a method for assisting a merging vehicle with a merge maneuver including a preceding vehicle and a following vehicle based on a ramp location of a ramp. The method includes the host vehicle joining a swarm created to assist the merging vehicle in the merge maneuver. The swarm includes a plurality of members, and the host vehicle becomes a member of the plurality of members. The method also includes identifying relative positions of the host vehicle and other members of the plurality of members. The method further includes selecting a role for the host vehicle as the merging vehicle, the preceding vehicle, or the following vehicle based on the relative positions of the host vehicle and the other members of the plurality of members. The method yet further includes calculating a merge location area based on the relative positions of the host vehicle and the other members of the plurality of members and the ramp location. The method still further includes determining a cooperative action for the host vehicle based on the role of the host vehicle and the merge location area.

BRIEF DESCRIPTION OF THE DRAWINGS

FIG. 1C is a schematic diagram of the traffic scenario with the merging vehicle accessing a ramp from the second lane, according to an exemplary embodiment.

FIG. 1D is a schematic diagram the traffic scenario with the merging vehicle on the ramp, according to an exemplary embodiment.

DETAILED DESCRIPTION

Figure 1A:
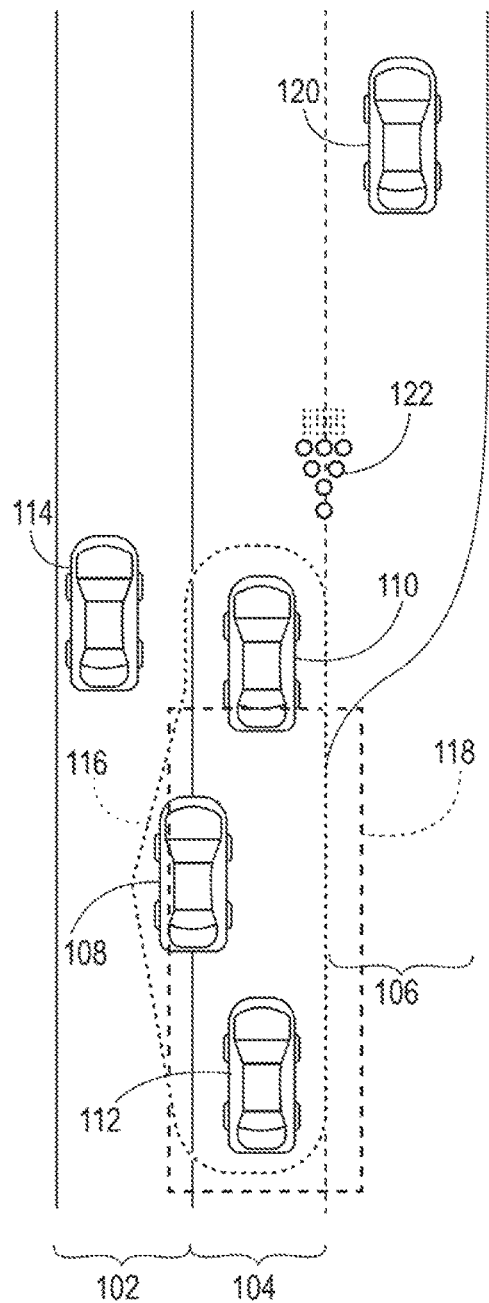
FIG. 1A is a schematic diagram of a traffic scenario with a merging vehicle changing lanes from a first lane to a second lane, according to an exemplary embodiment.

Generally, the systems and methods disclosed herein are directed to a group of vehicles facilitating a merge maneuver based on a ramp location. For example, turning to FIG. 1A, suppose traffic is moving downstream on a roadway 100 having a first lane 102, a second lane 104, and ramp 106. The roadway 100 can be any type of road, highway, freeway, pathway, or travel route. Furthermore, the roadway 100 may have various configurations not shown in FIG. 1A. For example, the roadway 100 may have any number of lanes. As another example, here the ramp 106 is illustrated as an exit ramp in FIGS. 1A-1D, but the ramp 106 may also be an entrance ramp.

A merging vehicle 108 cannot access the ramp 106 from the first lane 102 because the first lane 102 is separated from the ramp 106 by the second lane 104. Therefore, to access the ramp 106 the merging vehicle may attempt a lateral movement from the first lane 102 to the second lane 104. The lateral movement may include a merge maneuver to position the merging vehicle 108 between the preceding vehicle 110 and the following vehicle 112. The merge maneuver may be further complicated by an obstacle 114 in the first lane 102. Here, the obstacle 114 is illustrated as a vehicle that may be slow moving or disabled.

The attempts of the merging vehicle 108 to cut across the roadway 100 may be dangerous. A significant number of accident, slow-downs, and/or traffic congestion on roadway, like the roadway 100, are due to vehicles, such as the merging vehicle 108 attempting to negotiate or cut in from of traffic to access the ramp 106. For example, if the merging vehicle 108 erratically cuts in front of the following vehicle 112, the following vehicle 112 may aggressively brake to avoid a collision with the merging vehicle 108. To address the safety concerns of the merging vehicle 108 attempting move through multiple lanes of the roadway 100, a swarm 116 may be created. The swarm 116 may allow the merging vehicle 108, the preceding vehicle 110, and the following vehicle 112 to cooperate to assisting the merging vehicle 108 with the merge maneuver between the preceding vehicle 110 and the following vehicle 112 based on the proximity of the merging vehicle 108 to the ramp 106.

Definitions

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication," as used herein, refers to a communication between two or more computing devices (e.g., computer, personal digital assistant, cellular telephone, network device, vehicle, vehicle computing device, infrastructure device, roadside device) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

A "disk," as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database," as used herein can refer to table, a set of tables, a set of data stores and/or methods for accessing and/or manipulating those data stores. Some databases can be incorporated with a disk as defined above.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Obstacle", as used herein, refers to any objects in the roadway and may include pedestrians crossing the roadway, other vehicles, animals, debris, potholes, etc. Further, an 'obstacle' may include most any traffic conditions, road conditions, weather conditions, etc. Examples of obstacles may include, but are not necessarily limited to other vehicles (e.g., obstacle vehicle), buildings, landmarks, obstructions in the roadway, road segments, intersections, etc. Thus, obstacles may be found, detected, or associated with a path, one or more road segments, etc. along a route on which a vehicle is travelling or is projected to travel along.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

A "vehicle occupant," as used herein can include, but is not limited to, one or more biological beings located in the vehicle. The vehicle occupant can be a driver or a passenger of the vehicle. The vehicle occupant can be a human (e.g., an adult, a child, an infant) or an animal (e.g., a pet, a dog, a cat).

I. System Overview

As discussed above with respect to FIG. 1A, the swarm 116 may be created to assist the merging vehicle 108 to merge with the preceding vehicle 110 and the following vehicle 112. In some embodiments, the merging vehicle 108, the preceding vehicle 110, and the following vehicle 112 may share cooperative information including positioning data, velocity data, roadway information, and path planning, among others based on their respective sensor data. The cooperative information may be used to calculate a merge location area 118. The merge location area 118 is zone of the roadway that is deemed safe to execute the merge maneuver. For example, the merging vehicle 108 may execute a lateral movement into the second lane 104 within the merge location area 118. If the merging vehicle 108 is unable to make a lateral movement into the merge location area 118, then the merge maneuver is unavailable to the merging vehicle 108.

The merge location area 118 is defined as an area of a target lane that a merging vehicle 108 would make a lateral move from a current lane to enter. For example, the current lane of the merging vehicle 108 is the first lane 102 in FIG. 1A. The target lane of the merging vehicle 108 is the second lane 104 of FIG. 1A. The merge location area 118 may follow the preceding vehicle 110 or be ahead of the following vehicle 112. Here, the merge location area 118 is positioned between the preceding vehicle 110 and the following vehicle 112. The length of the merge location area 118 may be defined by the distance from the following vehicle 112 to the preceding vehicle 110. The length of the merge location area 118 may be compared to a gap threshold value to determine whether the merge location area 118 is of sufficient size to accommodate the merging vehicle 108. In some embodiments, the gap threshold is twice the length of the merging vehicle 108. In some embodiments, the length of the merge location area 118 may greater than the gap threshold value to indicate that the merge location area 118 will have sufficient size to accommodate the merging vehicle 108. Accordingly, the merge location area 118 may be a safe distance constraint is applied between adjacent vehicles and/or inline vehicles.

In some embodiments, additional safety constraints may be calculated and applied to the swarm 116. For example, a ramp traffic condition of the ramp 106 may be calculated to define the traffic characteristics of the ramp. For example, traffic in the first lane 102 and the second lane 104 may move at a first average speed (e.g., 70 miles per hour (mph)) while the vehicles, such as a ramp vehicle 120, on the ramp 106 are moving at a second average speed (e.g. 45 mph) that is slower than the first average speed. Accordingly, even if the merging vehicle 108 is able to merge into the merge location area 118, the merging vehicle 108 will need sufficient time to adapt to the ramp traffic condition. Given the average speed example from above, the merging vehicle 108 will need sufficient time and distance to slow from the first average speed to the second average speed. Thus, additional constraints may be calculated and applied to the merging vehicle 108, the preceding vehicle 110, and the following vehicle 112. The merging vehicle 108, the preceding vehicle 110, and the following vehicle 112 can then determine cooperative actions based on the constraint.

Figure 2:
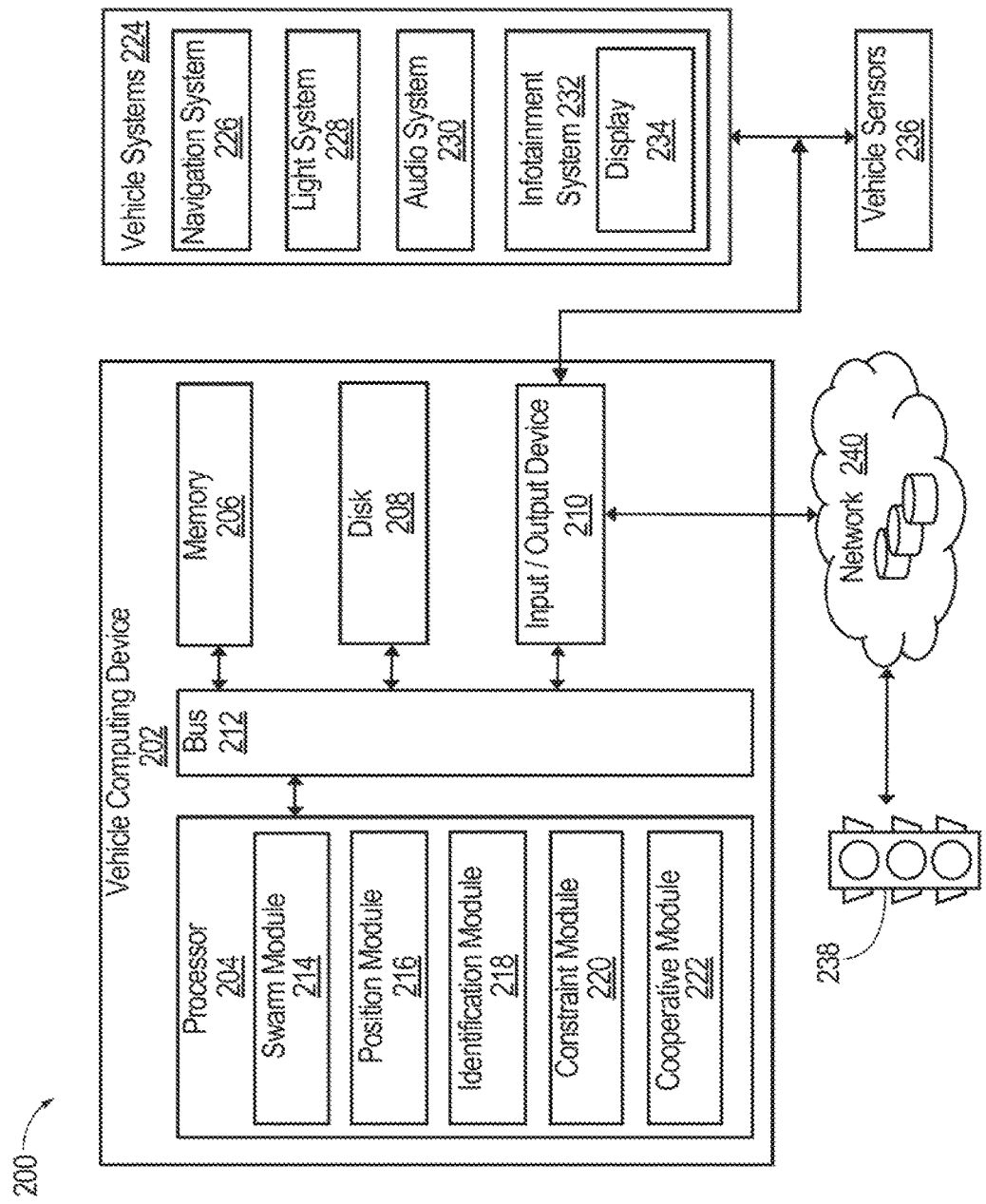
FIG. 2 is a schematic diagram of an operating environment for implementing systems and methods for a cooperative ramp merge according to an exemplary embodiment.

FIG. 2 is a schematic diagram of an operating environment 200 for cooperative ramp merge. The components of operating environment 200, as well as the components of other systems, hardware architectures, and software architectures discussed herein, can be combined, omitted, or organized into different architectures for various embodiments. Further, the components of the operating environment 200 can be implemented with or associated with a host vehicle, such as example host vehicle 300 (shown in FIG. 3). The host vehicle 300 may be any vehicle of the swarm 116, such as the merging vehicle 108, the preceding vehicle 110, and the following vehicle 112. In some embodiments, each vehicles of the swarm 116 is a host vehicle 300.

In the illustrated embodiment of FIG. 2, the operating environment 200 includes a vehicle computing device (VCD) 202 with provisions for processing, communicating and interacting with various components of the host vehicle 300 and other components of the operating environment 200. In one embodiment, the VCD 202 can be implemented with the example host vehicle 300, for example, as part of a telematics unit, a head unit, a navigation unit, an infotainment unit, an electronic control unit, among others. In other embodiments, the components and functions of the VCD 202 can be implemented remotely from the example host vehicle 300, for example, with a portable device (not shown) or another device connected via a network (e.g., a network 240).

Generally, the VCD 202 includes a processor 204, a memory 206, a disk 208, and an input/output (I/O) interface 210, which are each operably connected for computer communication via a bus 212 and/or other wired and wireless technologies. The I/O interface 210 provides software and hardware to facilitate data input and output between the components of the VCD 202 and other components, networks, and data sources, which will be described herein. Additionally, the processor 204 includes a swarm module 214, a position module 216, an identification module 218, a constraint module 220, and a cooperative module 222 to implement the systems and methods for a cooperative ramp merge, facilitated by the components of the operating environment 200.

The VCD 202 is also operably connected for computer communication (e.g., via the bus 212 and/or the I/O interface 210) to one or more vehicle systems 224. The vehicle systems 224 can include, but are not limited to, any automatic or manual systems that can be used to enhance the vehicle, driving, and/or safety. Here, the vehicle systems 224 include a navigation system 226, a light system 228, an audio system 230, and an infotainment system 232 according to an exemplary embodiment. The navigation system 226 stores, calculates, and provides route and destination information and facilitates features like turn-by-turn directions. The light system 228 controls the lights of the vehicle to actuate, including, for example, exterior lights (e.g., turn signal lights) and/or interior lights such as the dashboard lights. The audio system 230 controls audio (e.g., audio content, volume) in the example host vehicle 300. The infotainment system 232 provides visual information and/or entertainment and can include a display 234.

The vehicle systems 224 include and/or are operably connected for computer communication to the vehicle sensors 236. The vehicle sensors 236 provide and/or sense sensor data associated with the host vehicle 300, the vehicle environment, and/or the vehicle systems 224. The vehicle sensors 236 can include, but are not limited to, environmental sensors, vehicle speed sensors, accelerator pedal sensors, brake sensors, throttle position sensors, wheel sensors, anti-lock brake sensors, camshaft sensors, among others. In some embodiments, the vehicle sensors 236 are incorporated with the vehicle systems 224. For example, one or more vehicle sensors 236 may be incorporated with the navigation system 226 to monitor characteristics of the host vehicle 300, such as location and speed.

The vehicle sensors 236 can include, but are not limited to, image sensors, such as cameras, optical sensors, radio sensors, etc. mounted to the interior or exterior of the example host vehicle 300 and light sensors, such as light detection and ranging (LiDAR) sensors, radar, laser sensors etc. mounted to the exterior or interior of the example host vehicle 300. Further, vehicle sensors 236 can include sensors external to the example host vehicle 300 (accessed, for example, via the network 240), for example, external cameras, radar and laser sensors on other vehicles in a vehicle-to-vehicle network, street cameras, surveillance cameras, among others.

Figure 3:
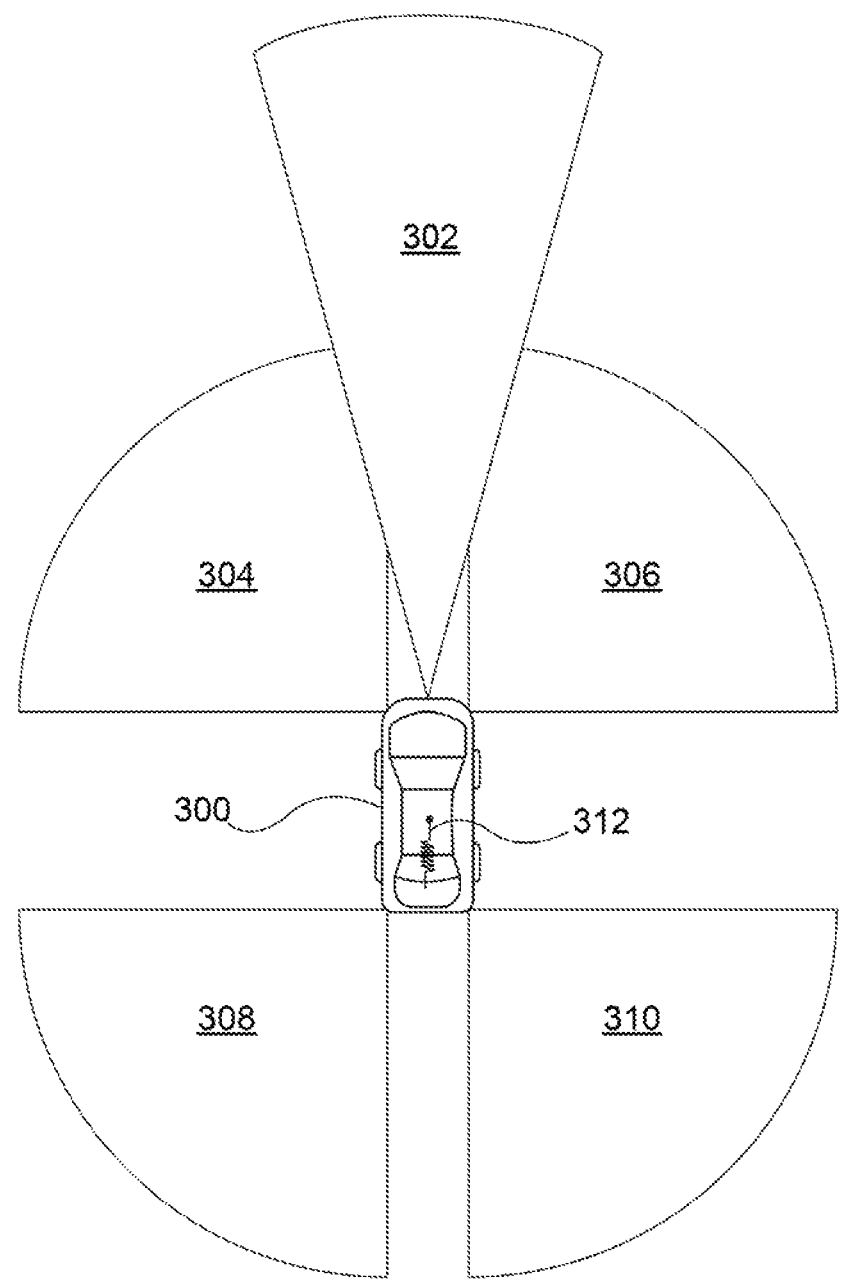
FIG. 3 is a schematic illustration of a host vehicle having example proximate vehicle sensors according to an exemplary embodiment.

An example host vehicle 300 having vehicle sensors 236 is shown in FIG. 3. The vehicle sensors 236 may include a forward sensor 302. The forward sensor 302 may be image sensor, such as camera, or an optical sensor, such as a Radio Detection And Ranging (RADAR) or Light Detection and Ranging (LiDAR) device. As shown here, the forward sensor 302 may have a 160 meter range and a 20° field of view. The forward sensor 302 may be mounted to the interior or exterior of the example host vehicle 300. The mounting (not shown) of the forward sensor 302 may be fixable to hold the forward sensor 302 in a fixed position or a radial mounting to allow the forward sensor 302 to rotate about the example host vehicle 300. The forward sensor 302 may detect visible and infra-red light from the proximate vehicles. The forward sensor 302 may also detect a pattern of light in images processed by the processor 204 or one of the vehicle systems 224. The pattern of light may indicate that at least one proximate vehicle has illuminated a turn signal or identify pavement markings on the roadway 100.

The vehicle sensors 236 may additionally include corner sensors 304, 306, 308, and 310. In one embodiment, the corner sensors 304, 306, 308, and 310 may be RADAR or LiDAR sensors or any other kind of sensors for identifying at least one vehicle in sensor range of the host vehicle 300. The vehicle sensors 236 can be disposed on any location of the interior or exterior of the host vehicle 300. For example, the vehicle sensors 236 can be disposed in the doors, bumpers, wheel wells body, rearview mirror, side view mirror, dashboard, rear window, etc. In one example, the corner sensors 304, 306, 308, and 310 may be mounted at the corners of the vehicle, and each of the corner sensors 304, 306, 308, and 310 may have an 80 meter range and a 90° field of view.

The vehicle sensors 236 may additionally monitor the environment of the host vehicle 300 receive sensor data about other vehicles on the roadway 100 proximate to the host vehicle 300. For example, suppose that the merging vehicle 108 is the host vehicle 300. The sensor data may include information about the preceding vehicle 110, the following vehicle, the ramp vehicle 120 as well as the obstacle 114. The sensor data may include the location and speed of the proximate vehicles, as well as relative characteristics of the host vehicle 300 and the proximate vehicles. For example, again suppose that the host vehicle 300 is the merging vehicle 108. The sensor data may include the relative distances and relative velocities between the merging vehicle and the preceding vehicle 110, the following vehicle 112, the ramp vehicle 120 as well as the obstacle 114. Accordingly, the vehicle sensors 236 are operable to sense a measurement of sensor data associated with the host vehicle 300, the vehicle environment, the vehicle systems 224, and/or the proximate vehicles and generate a data signal indicating said measurement of data. These data signals can be converted into other data formats (e.g., numerical) and/or used by the vehicle systems 224 and/or the VCD 202 to generate other data metrics and parameters. It is understood that the vehicle sensors 236 can be any type of sensor, for example, acoustic, electric, environmental, optical, imaging, light, pressure, force, thermal, temperature, proximity, among others.

The roadside equipment 238 may use the network 240 or other communication device (e.g., Dedicated Short Range Communications or other wireless technologies) to communicate with the components of the operating environment 200 including the host vehicle 300. The roadside equipment 238 communicates information about the roadways 100, traffic conditions on the roadways 100, and traffic devices, such as a traffic signal. The roadside equipment 238 may include, for example, external cameras, street cameras, traffic signal sensor, traffic signal cameras, surveillance cameras, and in-pavement sensors, among others.

The network 240 is, for example, a data network, the Internet, a wide area network or a local area network. The network 240 serves as a communication medium to various remote devices (e.g., databases, web servers, remote servers, application servers, intermediary servers, client machines, other portable devices). More specifically, in one embodiment, the VCD 202 can exchange data and/or transmit messages with other compatible vehicles and/or devices via a transceiver 312 or other communication hardware and protocols. For example, the transceiver 312 can exchange data with corresponding structures of the proximate vehicles. In some embodiments, the host vehicle 300 and the proximate vehicles can also exchange data (e.g., vehicle data as described herein) over remote networks by utilizing roadside equipment 238, and/or the communication network 240 (e.g., a wireless communication network), or other wireless network connections.

II. Application of Systems and Methods

The application of systems and methods are described with respect to a host vehicle 300. The host vehicle 300 is a vehicle having the operating environment 200 described above. The host vehicle 300 may be a vehicle in the first lane 102, the second lane 104 adjacent the first lane 102, or the ramp 106 adjacent the second lane 104. Examples will be described in which either the merging vehicle 108, the preceding vehicle 110, or the following vehicle 112 is a host vehicle 300 or each of the merging vehicle 108, the preceding vehicle 110, or the following vehicle 112 are host vehicles. The examples are exemplary in nature and are not provided to be limiting. For example, an embodiment in which the merging vehicle 108 is a host vehicle 300 does not imply that the following vehicle 112 is not a host vehicle 300. The following vehicle 112 may or may not be a host vehicle 300. Accordingly, the disclosed features and functions, or alternatives or varieties thereof, of the host vehicle 300 may be implemented by either the merging vehicle 108 or the preceding vehicle 110, or the following vehicle 112.

As discussed above, the merging vehicle 108, the preceding vehicle 110, and/or the following vehicle 112 can be the host vehicle 300 that employs the operating environment 200 to assist the host vehicle 300 in anticipating traffic perturbations propagating from downstream proximate vehicles and facilitate access to the ramp 106. For example, in a first embodiment, the host vehicle 300 may be the merging vehicle 108 that is attempting to maneuver from the first lane 102 to the ramp 106. In a second embodiment, the operating environment 200 may facilitate the merging vehicle 108 maneuvering from the ramp 106 to the first lane 102 or the second lane 104. Accordingly, the merging vehicle 108 may maneuver in conjunction with the preceding vehicle 110 and/or the following vehicle 112 to facilitate the merging vehicle 108 moving toward or from the ramp 106.

Figure 4:
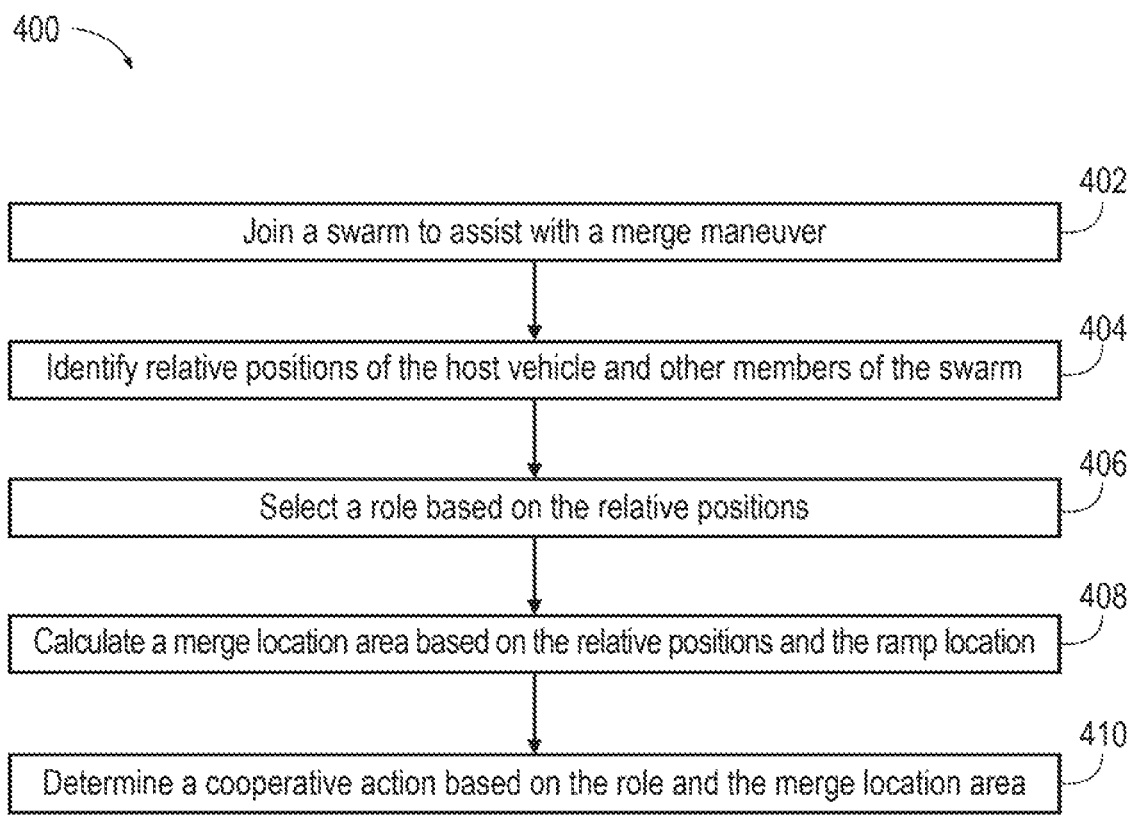
FIG. 4 is a process flow diagram of a method for cooperative ramp merge according to an exemplary embodiment.

Referring now to FIG. 4, a method 400 for cooperative ramp merge will now be described according to an exemplary embodiment. FIG. 4 will also be described with reference to FIGS. 1A-3. For simplicity, the method 400 will be described by a series of steps, but it is understood that the steps of the method 400 can be organized into different architectures, blocks, stages, and/or processes.

At block 402, the method 400 includes the swarm module 214 causing a host vehicle 300 to join the swarm 116 created to assist the merging vehicle 108 in a merge maneuver. The swarm 116 may include three or more cooperating vehicles. Here, the swarm 116 includes the merging vehicle 108 or the preceding vehicle 110, or the following vehicle 112. The manner in which the cooperating vehicles of the swarm 116 function together is based, at least in part, on the common goal shared by the cooperating goals. For example, suppose the goal is to aid the merging vehicle 108 that in maneuvering from the first lane 102 to the ramp 106. Here the merging vehicle 108 may be the host vehicle 300.

The goal may be determined based on the vehicle data, traffic data, road data, curb data, vehicle location and heading data, high-traffic event schedules, weather data, or other transport related data from any number of sources such as the merging vehicle 108, the preceding vehicle 110, or the following vehicle 112, roadside equipment 238, infrastructure, etc. Additionally or alternatively, the goal may be based on communication between the merging vehicle 108, the preceding vehicle 110, or the following vehicle 112. For example, the merging vehicle 108 may broadcast a request for assistance in moving to the ramp 106 to any vehicle in communications range of the merging vehicle 108.

In another embodiment, the merging vehicle 108 may target communication to specific vehicles. For example, the merging vehicle 108 may identify vehicles capable of cooperating (i.e., cooperating vehicles) that affect the goal. For example, to move into the second lane 104, the merging vehicle 108 may require a certain amount of space relative to vehicles already traveling in the second lane 104, here, the space may be between the preceding vehicle 110 and the following vehicle 112. In another embodiment, the merging vehicle 108 may identify vehicles that are not capable of cooperating (i.e., non-cooperating vehicles) and not include those vehicles in communications. For example, the obstacle 114 may be a non-cooperating vehicle that does not have the sensor or system capability to cooperate. Thus, the merging vehicle 108 may not send messages to the obstacle 114. In this manner, merging vehicle 108 may target specific vehicles to join the swarm and communicate accordingly.

At block 404 the method 400 includes the position module 216 identifying relative positions of the host vehicle 300 and other members of the plurality of members. In some embodiments, the relative positions may be calculated by vehicle systems 224 and/or the vehicle sensors 236. In some embodiment, the vehicle sensors 236 may determine the relative positions of the members of the swarm 116. For example, the vehicle sensors 236 may use ranging technology such as RADAR or LiDAR to determine the distance to the members. In another embodiment, the position module 216 may calculate the relative positions based on information received from the members of the swarm 116. Continuing the example from above, suppose that the merging vehicle 108 is the host vehicle 300, the merging vehicle 108 may receive vehicle data (e.g., location data, velocity data, acceleration data, etc.) from the preceding vehicle 110 and/or the following vehicle 112. The position module 216 may use the data to calculate other position dependent information. For example, the position module 216 may also calculate relative velocities of the host vehicle 300 and other members of the swarm.

At block 406 the method 400 includes the identification module 218 selecting a role for the host vehicle 300 as the merging vehicle 108, the preceding vehicle 110, or the following vehicle 112 based on the relative positions of the host vehicle 300 and the other members of the swarm 116. The role defines the objective of the member of the host vehicle 300 within the goal. For example, the objective of the merging vehicle 108 may be to move toward or from the ramp 106. Accordingly, if the path planning of the host vehicle 300 includes the host vehicle 300 accessing the ramp 106, the identification module 218 selects the merging vehicle 108 as the role of the host vehicle 300.

As another example, that the objective of the preceding vehicle 110 and/or the following vehicle 112 may be to create a merge location area 118 large enough to accommodate the merging vehicle 108. Accordingly, if the swarm request was received from the merging vehicle 108, the preceding vehicle 110 and/or the following vehicle 112 may use the relative position of the merging vehicle 108 to identify the merging vehicle 108 as planning to move into the second lane 104 currently occupied by the preceding vehicle 110 and/or the following vehicle 112 to access the ramp 106. The identification module 218 selects the preceding vehicle 110 and/or the following vehicle 112 as the role of the host vehicle 300 based on the relative position of the host vehicle 300 and the merging vehicle 108.

At block 408 the method 400 includes the constraint module 220 calculates at least one constraint. The constraint acts as a safety threshold that limits the ability of the members of the swarm 116 to assist in the cooperative ramp merge. The constraints may include the merge location area 118 and the ramp traffic condition. The constraint module 220 calculates the merge location area 118 based on the relative positions of the host vehicle 300 and the other members of the plurality of members and the ramp location. Likewise, the constraint module 220 calculates the ramp traffic condition of the ramp 106 may be calculated to define the traffic characteristics of the ramp 106 based on the ramp vehicles 120.

In one embodiment, the constraint module 220 may calculate the constraints for the merging vehicle 108, the preceding vehicle 110, and/or the following vehicle 112 to complete a lane change maneuver while minimizing the corresponding energy consumption and the maneuver time. Accordingly, depending on the role of the host vehicle 300, a specific optimization problem is formulated assuming that $x_i(0)$ and $v_i(0)$ are given:

$$J(t_f; u_i(t)) = \min_{u_i(t)} \int_0^{t_f} [w_t + w_u[u_1^2(t) + u_2^2(t) + u_C^2(t)]]dt$$

$$x_1(t)x_2(t) > d_2(v_2(t)),$$

$$t \in [0, t_f]$$

$$x_U(t)x_C(t) > d_C(v_C(t)),$$

$$t \in [0, t_f]$$

$$x_1(t_f) - x_C(t_f) > d_C(v_C(t_f)),$$

$$x_C(t_f) - x_2(t_f) > d_2(v_2(t_f))$$

where $w_t$, $w_u$ are weights associated with the maneuver time $t_f$ and with a measure of the total energy expended. The two terms in the previous function need to be properly normalized and we set $$w_t = \frac{\rho}{T_{max}} \text{ and } w_u = \frac{1-\rho}{\max\{u_{imax}^2 u_{imin}^2\}},$$

where $\rho \in [0,1]$ and $T_{max}$ is a prespecified upper bound on the maneuver time (e.g., $\tau_{max}=l/\min\{v_{i\,min}\}$, i=the merging vehicle 108, the preceding vehicle 110, and/or the following vehicle 112, and where l is the distance to the ramp 106. If $\rho=0$ this problem reduces to an energy minimization problem and if $\rho=1$ it reduces to minimizing the maneuver time. The safe distance is defined as $d_i(v_i(t))=\phi v_i(t)+l$ where $\phi$ is the reaction time.

The problem allows for a free terminal time $t_f$ and terminal state constraints $x_i(t_f)$, $v_i(t_f)$. The terminal time $t_f$ may be the solution of a minimization problem which allows each vehicle to specify a desired "aggressiveness level" relative to the shortest possible maneuver time. The maneuver terminal time $t_f$ is specified:

$$\min_{t_f > 0} t_f$$

$$x_1(0) + v_1(0)t_f + 0.5\alpha_1 u_{1max} t_f^2 - x_C(0) - v_C(0)t_f - 0.5\alpha_{C_uC} \max t_f^2 >$$

$$d_C(v_C(t_f)),$$

$$x_U(t_f) - x_C(0) - v_C(0)t_f - 0.5\alpha_{C_uC}\min t_f^2 > d_C(v_C(t_f)),$$

$$x_C(0) + v_C(0)t_f + 0.5\alpha_{C_uC}\min t_f^2 -$$

$$x_2(0) - v_2(0)t_f - 0.5\alpha 2\, u_{2\,min} t_f^2 > d_2(v_2(t_f))$$

where $\alpha \in [0,1)$, is an "aggressiveness coefficient" for the host vehicle 300 which can be preset by the driver. Observe that $[x_i(t_0)+v_i(t_0)t_f+0.5\alpha i\, u_{i\,max}\, t_f^2]$ is the terminal position of i under control $\alpha i\, u_{i\,max}$. The first constraint in ensures that the terminal distance between the preceding vehicle 110 and the merging vehicle 108 satisfies the safety constraint when both vehicles accelerate at desirable (but feasible) levels, thus seeking to minimize the maneuver time regardless of any energy consideration. The second constraint considers the terminal distance between the merging vehicle 108 and the obstacle 114 under the assumption that the obstacle 114 moves at constant speed which the merging vehicle 108 can estimate so as to evaluate $x_U(t_f)$. The last constraint considers the terminal distance between vehicles the merging vehicle 108 and the following vehicle 112 when both vehicles decelerate at desirable (but feasible) levels.

With the terminal time $t_f$ and longitudinal position $x_i(t_f)=x_{if}$ the optimal control problems of the merging vehicle 108, the preceding vehicle 110, the following vehicle 112, and or the obstacle 114 becomes:

$$\min \int_0^{t_f} \frac{1}{2} u_1^2(t)dt \text{ s.t. } (1),(2), x_1(t_f)=x_{1f}$$

$$\min \int_0^{t_f} \frac{1}{2} u_2^2(t)dt \text{ s.t. } (1),(2), x_2(t_f) \leq x_{2f}$$

$$x_1(t)-x_2(t) > d_2(v_2(t)), t \in [0, t_f]$$

The constraint module 220 may use an inequality $x_2(t_f) \leq x_{2f}$ to describe the terminal position constraint instead of the equality since it suffices for the distance between the two vehicles to accommodate the merging vehicle 108 while at the same time allowing for the cost under a control with $x_2(t_f)<x_{2f}$ to be smaller than under a control with $x_2(t_f)=x_{2f}$. The constraint module 220 may not consider the case that $x_1(t_f)>x_{1f}$ since the optimal cost when $x_1(t_f)=x_{1f}$ is smaller compared to $x_1(t_f)>x_{1f}$. To maintain the merge location area 118, the solution of these two problems may be based on the preceding vehicle 110 not decelerating and the following vehicle 112 never accelerating.

The merge location area 118 provides a safe distance between the vehicles such as the merging vehicle 108, the preceding vehicle 110, and the following vehicle 112. Accordingly, a constraint $x_U(0)+v_U t-x_C(t)>d_C(v_C(t))$ must hold for all $t \in [0, t_f]$. The resulting problem formulation is:

$$\min \int_0^{t_f} \frac{1}{2} u_C^2(t)dt$$

$$x_C(t_f)=x_{Cf}, t \in [0, t_f]$$

$$x_U(0)+v_U t-x_C(t)>d_C(v_C(t))$$

in which $d_C(v_C(t))$ is time-varying. To simplify $d_C \equiv \max\{d_C(v_C(t))\}$ instead of $d_C(v_C(t))$, which is a more conservative constraint still ensuring that the original one is not violated. Additionally, the constraint module 220 may alternatively solve $d_C(v_C(t)) = \phi vC(t) + 1$.

The Hamiltonian for with the constraints adjoined yields the Lagrangian $$L(x_C, v_C, u_C, \lambda, \eta) = \frac{1}{2}u_C^2(t) + \lambda x(t)v_C(t) + \lambda v(t)u_C(t) +$$
$$\eta_1(t)(u_C(t) - u_{C\,max}) + \eta_2(t)(u_{C\,min} - u_C(t)) + \eta_3(t)(v_C(t) - v_{C\,max}) +$$
$$\eta_4(t)(v_{C\,min} - v_C(t)) + \eta_5(t)(x_C(t) - x_U(0) - v_U(0)t + d_C)$$

with $\lambda(t) = [\lambda_v(t), \lambda_x(t)]^T$ and $\eta = [\eta\ 1\ (t), \eta\ 5\ (t)]T$, $t \in [0, t_f]$, such that:

$$u_C^*(t) = \begin{cases} -\lambda v(t) & \text{if } u_{C\,min} \leq -\lambda v(t) \leq u_{C\,max} \\ u_{C\,min} & \text{if } -\lambda v(t) < u_{C\,min} \\ u_{C\,max} & \text{if } -\lambda v(t) > u_{C\,max} \end{cases}$$

when none of the constraints is active along a trajectory. In order to account for the constraints becoming active, several cases can be identified depending on the terminal states of vehicles. The constraint module 220 may define $\bar{x}(t_f)$ to be the terminal position of the merging vehicle 108 if $u_C(t)=0$ for all $t \in [0, t_f]$. The relationship between $\bar{x}(t_f)$ and $x_C(t_f)$ may be such that $\bar{x}(t_f) < x_C(t_f)$. Thus, the merging vehicle 108 may accelerate in order satisfy the terminal position constraint. Otherwise, the merging vehicle 108 may decelerate. Accordingly, the constraint module 220 may calculate a merge location area 118 that is an area of the roadway 100 where the merging vehicle 108 can safely move. Although shown in the second lane 104, the merge location area 118 may also be present in the first lane 102 with respect to the obstacle 114.

The merge location area 118 may further be based on a threshold distance to a ramp obstacle 122, the ramp vehicle 120, or the roadside equipment 238. The ramp obstacle 122 may be a barrier that separates the second lane 104 from the ramp 106. For example, the ramp obstacle 122 may be a section of concrete wall, a reinforced fence, or a grouping of weighted barrels that prevent downstream lateral movement from the second lane 104 into the ramp 106. Accordingly, because the host vehicle would not be able to access the ramp 106 from the second lane 104 or the second lane 104 from the ramp 106 after passing the ramp obstacle 122, the constraint module 220 may limit the length of the merge location area 118 based on the ramp obstacle 122. For example, the constraint module 220 may prevent the merge location area 118 from extending within the distance threshold of 100 yards of the ramp obstacle 122. Thus, the distance threshold affords the host vehicle 300 adequate longitudinal distance to make a lateral move given the speed of the host vehicle 300. In some embodiments, the distance threshold may be based on the speed of the host vehicle 300.

The constraint module 220 is further configured to receive sensor data associated with the ramp 106 and calculate a ramp traffic condition of the ramp 106. The ramp traffic condition may also be calculated based on cooperative information including positioning data, velocity data, roadway information, and path planning, among others. In some embodiments, the ramp traffic condition is based on the velocity of traffic on the ramp 106 to the host vehicle 300 that is entering or exiting the ramp 106. Returning to the example from above, suppose the traffic in the first lane 102 and the second lane 104, including the merging vehicle 108 may move at a first average speed (e.g., 70 mph) while the ramp vehicle 120 on the ramp 106 is moving at a second average speed (e.g. 45 mph) that is slower than the first average speed. The constraint module 220 may calculate a ramp traffic condition as a velocity value, specifically, as the second average speed as that describes the current condition of the ramp 106. In another embodiment, the ramp traffic condition may facilitate the host vehicle adapting to the traffic on the ramp 106. For example, the ramp traffic condition as a deceleration value that allows the merging vehicle 108 to adapt to the slower traffic on the ramp 106.

At block 410 the method 400 includes the cooperative module 222 determining a cooperative action for the host vehicle 300 based on the role of the host vehicle 300 and the calculated constraints. For example, the cooperative module 222 may determine the cooperative action based on the role of the host vehicle 300 and the merge location area 118. The cooperative action may include movements that the host vehicle 300 is to make to facilitate a cooperative ramp merge. The cooperative action may include kinematic parameters for the host vehicle 300. For example, in generating the cooperative action, the cooperative module 222 additionally calculates the kinematic parameters needed to execute the cooperative action.

Here, the kinematic parameters for the merging vehicle 108 to move into the merge location area 118. The merge location area 118 may position the merging vehicle 108 behind the preceding vehicle 110 and ahead of the following vehicle 112. The kinematic parameters may also include a velocity, an acceleration, a trajectory (angle, lateral distance, longitudinal distance) for the merging vehicle 108, etc. For example, the kinematic parameters for the preceding vehicle 110 and/or ahead of the following vehicle 112 may include increasing or decreasing the speed of the preceding vehicle 110 and/or ahead of the following vehicle 112 to increase the area of the merge location area 118. Accordingly, the cooperative action may vary based on the host vehicle 300.

Figure 1B:
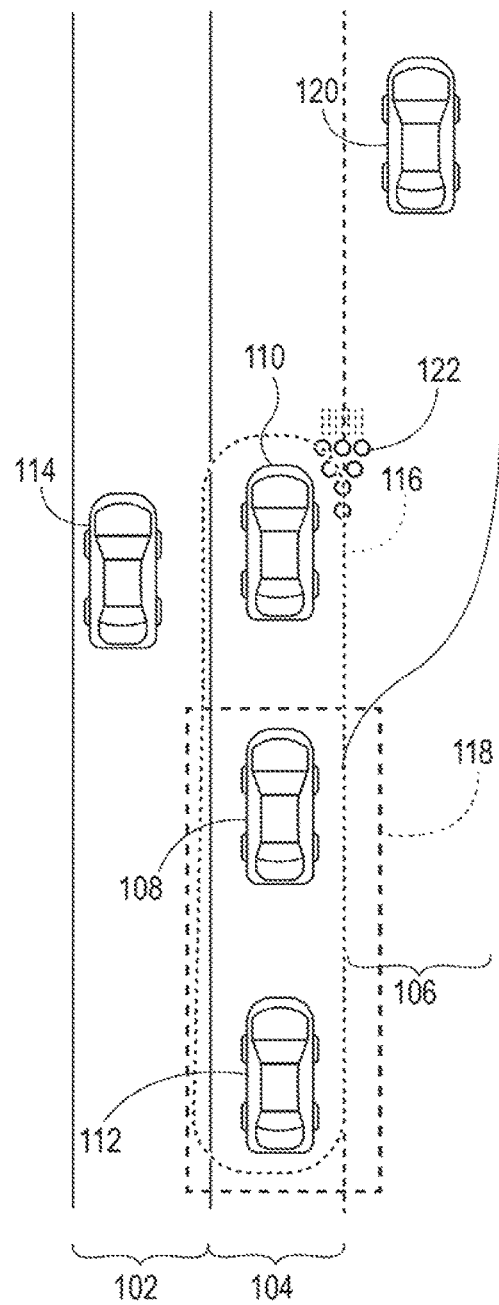
FIG. 1B is a schematic diagram the traffic scenario with the merging vehicle in the second lane, according to an exemplary embodiment.

Suppose the host vehicle 300 is the merging vehicle 108. The cooperative action may include a first cooperative action that defines a first move from the first lane 102 to the second lane 104, as shown in FIG. 1A. The first move is executed to allow the host vehicle 300 to occupy the merge location area 118, as shown in FIG. 1B. Once the first move has been executed by the merging vehicle 108, the method 400 may be performed again resulting in a second cooperative action that defines a second move from the second lane 104 to the ramp 106, as shown in FIG. 1C. In this manner, a next cooperative action can be determined for the host vehicle 300 based on the role of the host vehicle 300, the merge location area 118, and updated relative positions that reflect the current locations of the members of the swarm 116. Alternatively, the first cooperative action may include both the first move and the second move such that the merging vehicle 108 would move laterally across the first lane 102, the second lane 104, to the ramp in a continuous movement.

Whether the cooperative action includes a single move or a plurality of moves may be based on the merge location area 118 being at least a threshold distance from ramp 106. For example, when the merge location area 118 is greater than the threshold distance from the ramp, the cooperative action may include a plurality of moves. When the merge location area 118 is less than the threshold distance from the ramp 106, the cooperative action may include a single move for expediency.

In some embodiments, the cooperative module 222 assigns the cooperative action an emergency maneuver classification based on the comparison of the merge location area 118 to a safety threshold. The safety threshold may be a distance range to the location of the ramp 106. For example, the safety threshold may define a distance range that is minimum safe distance from the ramp obstacle 122 in which the host vehicle 300 can safely execute a lateral movement. When within the safety threshold, the cooperative action may be assigned the emergency maneuver classification so that the host vehicle 300 executes the cooperative action within a predetermined timeframe.

The host vehicle 300 may send the actions of the cooperative action to the other cooperative vehicles, in this example, the preceding vehicle 110 and the following vehicle 112. In one embodiment, the cooperative module 222 sends the cooperative to the vehicle systems 224 and the vehicle sensors 236 to determine if the cooperative action is feasible. For example, sensor data from the forward sensor 302 and the corner sensors 304, 306, 308, and 310 may be accessed to determine if a vehicle is in a position that would make the cooperative action unfeasible. If the cooperative action is deemed feasible, the cooperative action may be executed. If the cooperative action is not deemed feasible, the cooperative action may be abandon and the swarm 116 may be terminated.

The cooperative action includes an alert in response to the merge location area not satisfying the safety threshold. The cooperative module 222 assigns the merge maneuver an emergency maneuver classification based on the comparison of the merge location area to a safety threshold. The cooperative action is based on the emergency maneuver classification. The swarm module 214 causes the host vehicle 300 to leave the swarm 116 in response to the host vehicle 300 executing the cooperative action. Thus, the swarm 116 is created and joined to facilitate the cooperative ramp merge and once the cooperative ramp merge is executed the swarm 116 may be terminated. Thus, the systems and methods described facilitate access to the ramp 106 through cooperation of member of the swarm. The cooperation is based on constraints including the merge location area 118 and the ramp traffic condition. Moreover, the merge location area 118, distance threshold, and safety threshold facilitate timing issues based on the proximity of host vehicle 300 to the ramp 106.

The embodiments discussed herein can also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A cooperative ramp merge system for assisting a merging vehicle with a merge maneuver between a preceding vehicle and a following vehicle based on a ramp location of a ramp, the cooperative ramp merge system comprising:
   a swarm module configured to cause a host vehicle to join a swarm created to assist the merging vehicle in the merge maneuver, wherein the swarm includes a plurality of members, and wherein the host vehicle becomes a member of the plurality of members;
   a position module configured to identify relative positions of the host vehicle and other members of the plurality of members;
   an identification module configured to select a role for the host vehicle as the merging vehicle, the preceding vehicle, or the following vehicle based on the relative positions of the host vehicle and the other members of the plurality of members, wherein the merging vehicle is traveling in a longitudinal direction in a first lane and the preceding vehicle and the following vehicle are traveling in the longitudinal direction in a second lane that separates the first lane and the ramp;
   a constraint module configured to calculate a merge location area based on the relative positions of the host vehicle and the other members of the plurality of members and the ramp location; and
   a cooperative module configured to determine a cooperative action for the host vehicle based on the role of the host vehicle and the merge location area.

2. The cooperative ramp merge system of claim 1, wherein the constraint module is further configured to receive sensor data associated with the ramp and calculate a ramp traffic condition of the ramp, and
   wherein the cooperative module is further configured to determine the cooperative action based on the ramp traffic condition.

3. The cooperative ramp merge system of claim 2, wherein the ramp traffic condition is a velocity value associated with movement on the ramp.

4. The cooperative ramp merge system of claim 2, wherein the sensor data is received from roadside equipment.

5. The cooperative ramp merge system of claim 1, wherein the merge location area is based on a threshold distance to a ramp vehicle.

6. The cooperative ramp merge system of claim 5, wherein the ramp vehicle includes pavement markings.

7. The cooperative ramp merge system of claim 1, wherein the position module is further configured to calculate relative velocities of the host vehicle and other members of the plurality of members; and
   wherein the constraint module is further configured to compare the merge location area to a safety threshold is based on the relative velocities of the host vehicle and other members of the plurality of members.

8. The cooperative ramp merge system of claim 7, wherein the cooperative action includes an alert in response to the merge location area not satisfying the safety threshold.

9. The cooperative ramp merge system of claim 7, wherein the cooperative module is further configured to assign the merge maneuver an emergency maneuver classification based on the comparison of the merge location area to a safety threshold and adjust the cooperative action based on the emergency maneuver classification.

10. The cooperative ramp merge system of claim 1, wherein the swarm module is further configured to cause the host vehicle to leave the swarm in response to the host vehicle executing the cooperative action.

11. A cooperative ramp merge method for assisting a merging vehicle with a merge maneuver between a preceding vehicle and a following vehicle based on a ramp location of a ramp, the cooperative ramp merge method comprising:
joining, as a host vehicle, a swarm created to assist the merging vehicle in the merge maneuver, wherein the swarm includes a plurality of members, and wherein the host vehicle becomes a member of the plurality of members;
identifying relative positions of the host vehicle and other members of the plurality of members;
selecting a role for the host vehicle as the merging vehicle, the preceding vehicle, or the following vehicle based on the relative positions of the host vehicle and the other members of the plurality of members, wherein the merging vehicle is traveling in a longitudinal direction in a first lane and the preceding vehicle and the following vehicle are traveling in the longitudinal direction in a second lane that separates the first lane and the ramp;
calculating a merge location area based on the relative positions of the host vehicle and the other members of the plurality of members and the ramp location; and
determining a cooperative action for the host vehicle based on the role of the host vehicle and the merge location area.

12. The cooperative ramp merge method of claim 11, the method further comprising:
receiving sensor data associated with the ramp; and
calculating a ramp traffic condition of the ramp, wherein the cooperative action is further based on the ramp traffic condition.

13. The cooperative ramp merge method of claim 12, wherein the ramp traffic condition is a velocity value associated with movement on the ramp.

14. The cooperative ramp merge method of claim 11, the method further comprising:
determining if the merge maneuver is complete in response to the cooperative action being executed;
in response to the merge maneuver not being complete, updating the relative positions of the host vehicle and other members of the plurality of members; and
determining a next cooperative action for the host vehicle based on the role of the host vehicle, the merge location area, and the updated relative positions.

15. The cooperative ramp merge method of claim 11, the method further comprising:
calculating relative velocities of the host vehicle and other members of the plurality of members; and
comparing the merge location area to a safety threshold is based on the relative velocities of the host vehicle and other members of the plurality of members.

16. The cooperative ramp merge method of claim 15, wherein the cooperative action includes an alert in response to the merge location area not satisfying the safety threshold.

17. The cooperative ramp merge method of claim 11, the method further comprising leaving the swarm in response to the host vehicle executing the cooperative action.

18. A non-transitory computer-readable storage medium including instructions that when executed by a processor, cause the processor to perform a method for assisting a merging vehicle with a merge maneuver including a preceding vehicle and a following vehicle based on a ramp location of a ramp, the method comprising:
joining, as a host vehicle, a swarm created to assist the merging vehicle in the merge maneuver, wherein the swarm includes a plurality of members, and wherein the host vehicle becomes a member of the plurality of members;
identifying relative positions of the host vehicle and other members of the plurality of members;
selecting a role for the host vehicle as the merging vehicle, the preceding vehicle, or the following vehicle based on the relative positions of the host vehicle and the other members of the plurality of members, wherein the merging vehicle is traveling in a longitudinal direction in a first lane and the preceding vehicle and the following vehicle are traveling in the longitudinal direction in a second lane that separates the first lane and the ramp;
calculating a merge location area based on the relative positions of the host vehicle and the other members of the plurality of members and the ramp location; and
determining a cooperative action for the host vehicle based on the role of the host vehicle and the merge location area.

19. The non-transitory computer-readable storage medium of claim 18, the method further comprising:
receiving sensor data associated with the ramp; and
calculating a ramp traffic condition of the ramp, wherein the cooperative action is further based on the ramp traffic condition.

20. The non-transitory computer-readable storage medium of claim 19, wherein the ramp traffic condition is a velocity value associated with movement on the ramp.

\* \* \* \* \*